(12) United States Patent
Ishimoto et al.

(10) Patent No.: US 8,488,928 B2
(45) Date of Patent: Jul. 16, 2013

(54) OPTO-ELECTRO HYBRID HARNESS AND METHOD OF MANUFACTURING THE SAME

(75) Inventors: Takeki Ishimoto, Kanuma (JP); Yoshiki Chigusa, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 196 days.

(21) Appl. No.: 12/978,146

(22) Filed: Dec. 23, 2010

(65) Prior Publication Data

US 2011/0170835 A1 Jul. 14, 2011

(30) Foreign Application Priority Data

Jan. 14, 2010 (JP) .................................. 2010-006257

(51) Int. Cl.
*G02B 6/44* (2006.01)
(52) U.S. Cl.
USPC ............................................ 385/101; 385/89
(58) Field of Classification Search
USPC ..................................................... 385/101, 89
See application file for complete search history.

(56) References Cited

U.S. PATENT DOCUMENTS

| | | | | |
|---|---|---|---|---|
| 4,767,168 | A * | 8/1988 | Grandy .............................. | 385/53 |
| 6,078,712 | A * | 6/2000 | Tschope et al. ................. | 385/101 |
| 6,694,083 | B2 * | 2/2004 | Paradiso et al. ............... | 385/135 |
| 6,978,319 | B1 * | 12/2005 | Rostoker et al. .............. | 709/250 |
| 7,130,511 | B2 * | 10/2006 | Riester et al. .................. | 385/101 |
| 2002/0159725 | A1 * | 10/2002 | Bucklen ........................... | 385/101 |
| 2004/0175077 | A1 * | 9/2004 | Weber .............................. | 385/88 |
| 2005/0053340 | A1 * | 3/2005 | Toriumi et al. ................. | 385/101 |
| 2005/0201709 | A1 * | 9/2005 | DeVincentis et al. ........ | 385/135 |
| 2005/0220393 | A1 * | 10/2005 | Riester et al. .................. | 385/15 |
| 2006/0067690 | A1 * | 3/2006 | Tatum et al. ................... | 398/66 |
| 2007/0206906 | A1 * | 9/2007 | Stark et al. ..................... | 385/89 |

FOREIGN PATENT DOCUMENTS

| | | |
|---|---|---|
| JP | H02-221906 A | 9/1990 |
| JP | 2003-016856 A | 1/2003 |
| JP | 2006-129676 A | 5/2006 |
| JP | 2006129676 A * | 5/2006 |
| JP | 2008-310066 A | 12/2008 |
| JP | 2008310066 A * | 12/2008 |
| JP | 2009-238728 A | 10/2009 |

OTHER PUBLICATIONS

Japanese Office Action of the corresponding Japanese Application No. 2010-006257, dated May 8, 2012.

* cited by examiner

*Primary Examiner* — Charlie Peng
*Assistant Examiner* — Peter Radkowski
(74) *Attorney, Agent, or Firm* — Global IP Counselors, LLP

(57) ABSTRACT

The An opto-electro hybrid harness includes, at locations away from first and second connectors, a first relay segment having an EO conversion device, and a second relay segment having an OE conversion device. First and second electric cables lie between the first connector and the first relay segment and between the second connector and the second relay segment. An opto-electric hybrid cable segment lies between the first and second relay segments. An optical fiber is connected at one end to the E0 conversion device and at the other end to the OE conversion device. A first electronic wire of the first electric cable is connected at one end to the first connector and at the other end to the E0 conversion device. A second electronic wire of the second electric cable is connected at one end to the OE conversion device and at the other end to the second connector.

7 Claims, 8 Drawing Sheets

OPTO-ELECTRO HYBRID HARNESS AND METHOD OF MANUFACTURING THE SAME

TECHNICAL FIELD

The present invention relates to an opto-electro hybrid harness having an electronic wire and an optical fiber, and to a method for the manufacture thereof.

BACKGROUND ART

In the field of electronic devices such as medical instruments, handheld devices, compact video cameras, personal computers, personal digital assistants (PDAs), and the like, there is a need for faster communication commensurate with more advanced functionality. Communication via optical fiber is a preferred way of meeting this need. Also, in medical applications, cameras themselves have become more compact in size, giving rise to a need for more compact connectors for connection to these devices.

Japanese Laid-Open Patent Application 2009-238728, discloses in FIG. 30 thereof a connector for use with an opto-electro hybrid cable that combines a small-diameter coaxial cable and an optical fiber, and in which the connector has an OE conversion module that is connected to the optical fiber and surface-mounted on the relay connector of the terminal.

However, where an OE module is disposed on the connector (terminal section) in this manner, the connector tends to be bulky. If the connector is bulky, not only is it more difficult to handle, but it becomes difficult to accommodate the connector within small spaces. Moreover, a specialized connector furnished with an OE conversion module is required, which in turn necessitates also providing the device to which the connector will be connected with a specialized receptacle compatible with the connector, and this may entail higher costs.

DISCLOSURE OF THE INVENTION

An object of the present invention is to provide an opto-electro hybrid harness that does not entail increased size of the connector section, and that is universally adaptable and economical; and a method for the manufacture thereof.

To attain the above object, there is provided an opto-electro hybrid harness including: (1) an opto-electric hybrid cable segment that includes an optical fiber and a signal wire for carrying an electrical signal; (2) a first electric cable that includes a first electronic wire; (3) a second electric cable that includes a second electronic wire; (4) a first relay segment adapted to connect one end of the opto-electric hybrid cable segment and one end of the first electric cable, the first relay segment having a first board, and an EO conversion device mounted on the first board and adapted to convert an electrical signal to an optical signal; (5) a second relay segment adapted to connect the other end of the opto-electric hybrid cable segment and one end of a second electric cable, the second relay segment having a second board, and an OE conversion device mounted on the second board and adapted to convert an optical signal to an electrical signal; (6) a first connector which is an electrical connector attached to the other end of the first electric cable; and (7) a second connector which is an electrical connector attached to the other end of the second electric cable.

In this opto-electro hybrid harness, one end of the optical fiber is optically connected to the EO conversion device, and the other end of the optical fiber is optically connected to the OE conversion device. The first electronic wire is adapted to carry an electrical signal to the EO conversion device, and one end thereof is connected via a circuit on the first board to the EU conversion device, while the other end thereof is connected to the first connector. The second electronic wire is adapted to carry an electrical signal from the OE conversion device, and one end thereof is connected via a circuit on the second board to the OE conversion device, while the other end thereof is connected to the second connector. The signal wire is electrically connected to the first connector and to the second connector either directly or via another wiring member.

In the opto-electro hybrid harness of the present invention, the signal wire is optionally connected via a first relay board to one end of an additional electronic wire which is an electronic wire included in the first electric cable separately from the first electronic wire; and the other end of the additional electronic wire is connected to the first connector. The signal wire is optionally connected via a second relay board to one end of an additional electronic wire which is an electronic wire included in the second electric cable separately from the second electronic wire; and the other end of the additional electronic wire is connected to the second connector.

Alternatively, one end of the signal wire is directly connected to the first connector, and the other end is directly connected to the second connector. In this instance, it is preferable for the signal wire to be passed through the first relay segment to a side of the first board away from the mounting location of the EO conversion device, and to be passed through the second relay segment to a side of the second board away from the mounting location of the OE conversion device.

In the opto-electro hybrid harness of the present invention, in preferred practice, the first electric cable includes a first feeder line; one end of the first feeder line is connected to the first connector, and the other end is connected to the second connector either directly or via another wiring member. In preferred practice, the opto-electric hybrid cable segment includes a second feeder line; one end of the second feeder line is connected to a circuit on the first board that leads to the EO conversion device, and the other end is connected to the second connector either directly or via another wiring member. Moreover, in preferred practice, the second electric cable includes a third feeder line; one end of the third feeder line is connected to a circuit on the second board that leads to the OE conversion device; and the other end is connected to the second connector.

In the opto-electro hybrid harness of the present invention, in preferred practice, the shield layers of the first electric cable, the opto-electric hybrid cable segment, and the second electric cable are provided with electrical continuity via the first relay segment and the second relay segment. Additionally, in preferred practice, the enclosures of the first relay segment and the second relay segment have split-half structure; the first board is arranged in the first relay segment such that one of the split halves of the enclosure covers one face of the first board; and the second board is arranged in the second relay segment such that one of the split halves of the enclosure covers one face of the second board.

According to another aspect, the present invention provides a method for manufacturing an opto-electro hybrid harness comprising: (1) a relay segment attachment step in which a first relay segment is attached to one end of an opto-electric hybrid cable segment that includes an optical fiber and a signal wire for carrying an electrical signal, and a second relay segment is attached to the other end of the opto-electric hybrid cable segment; (2) an optical fiber initial end connection step in which one end of the optical fiber is optically connected to an EO conversion device which is mounted on a first board provided to the first relay segment and which is adapted to convert an electrical signal to an optical signal; (3) a first electronic wire connection step in which one end of a first electronic wire which is included in a first electric cable and adapted to carry an electrical signal to the EO conversion device is connected via a circuit on the first board to the EO conversion device, and the other end of the first electronic wire is connected to a first connector which is an electrical connector; (4) an optical fiber final end connection step in which the other end of the optical fiber is optically connected to an OE conversion device which is mounted on a second board provided to the second relay segment, and which is adapted to convert an optical signal to an electrical signal; (5) a second electronic wire connection step in which one end of a second electronic wire which is included in a second electric cable and adapted to carry an electrical signal from the OE conversion device is connected via a circuit on the second board to the OE conversion device, and the other end of the second electronic wire is connected to a second connector which is an electrical connector; and (6) a signal wire connection step in which the signal wire is connected to the first connector and the second connector either directly or via another wiring member.

Optionally, the signal wire connection step in the method for manufacturing an opto-electro hybrid harness according to the present invention involves connecting one end of the signal wire to one end of a circuit of a first relay board; connecting one end of an additional electronic wire, which is an electronic wire included in the first electric cable separately from the first electronic wire, to the other end of the circuit of the first relay board; and connecting the other end of the additional electronic wire to the first connector. Optionally, the signal wire connection step involves connecting the other end of the signal wire to one end of a circuit of a second relay board; connecting one end of an additional electronic wire, which is an electronic wire included in the second electric cable separately from second electronic wire, to the other end of the circuit of the second relay board; and connecting the other end of the additional electronic wire to the second connector.

Alternatively, the signal wire connection step involves directly connecting one end of the signal wire to the first connector, and directly connecting the other end to the second connector. In this case, in preferred practice, the signal wire in the first relay segment passes along a side of the first board away from the mounting location of the EO conversion device; and in the second relay segment passes along a side of the second board away from the mounting location of the OE conversion device.

In preferred practice, the method for manufacturing an opto-electro hybrid harness according to the present invention includes a first feeder line connection step in which one end of a first feeder line included in the first electric cable is connected to the first connector, and the other end of the first feeder line is connected to the second connector either directly or via another wiring member. In preferred practice, the method includes a second feeder line connection step in which one end of a second feeder line included in the opto-electric hybrid cable segment is connected to a circuit that leads to the EO conversion device on the first board, and the other end of the second feeder line is connected to the second connector either directly or via another wiring member. In preferred practice, the method includes a third feeder line connection step in which one end of a third feeder line included in the second electric cable is connected to a circuit that leads to the OE conversion device on the second board, and the other end of the third feeder line is connected to the second connector.

In the method for manufacturing an opto-electro hybrid harness according to the present invention, in preferred practice, the shield layers of the first electric cable, the opto-electric hybrid cable segment, and the second electric cable are provided with electrical continuity via the first relay segment and the second relay segment. Also, in preferred practice, the enclosures of the first relay segment and the second relay segment have a split-half structure; the first board is arranged in the first relay segment such that one of split halves of the enclosure covers one face of the first board; and the second board is arranged in the second relay segment such that one of split halves of the enclosure covers one face of the second board.

According to the opto-electro hybrid harness of the present invention, by having electrical connectors as connectors at both ends, and providing a first relay segment having an EO conversion device and a second relay segment having an OE conversion device, increased size of the connector may be avoided. Higher communication speeds may be attained through the use of optical fibers, and faster communications commensurate with more advanced functionality may be attained. Additionally, because a specialized connector equipped with an OE conversion module is not used, an electrical connector may be used on the connector receptacle side as well, and universal adaptability and good economy can be afforded. According to the method for manufacturing an opto-electro hybrid harness according to the present invention, an opto-electro hybrid harness with universal adaptability and good economy can be readily manufactured.

BEST MODE OF CARRYING OUT THE INVENTION

An embodiment of the present invention is described hereinbelow with reference to the drawings. It is to be understood that the drawings are intended for illustrative purposes and do not limit the scope of the invention. In order to avoid redundant description, similar parts are indicated by similar numerals in the drawings. Dimensional proportions are not necessarily depicted accurately in the drawings.

Figure 1:
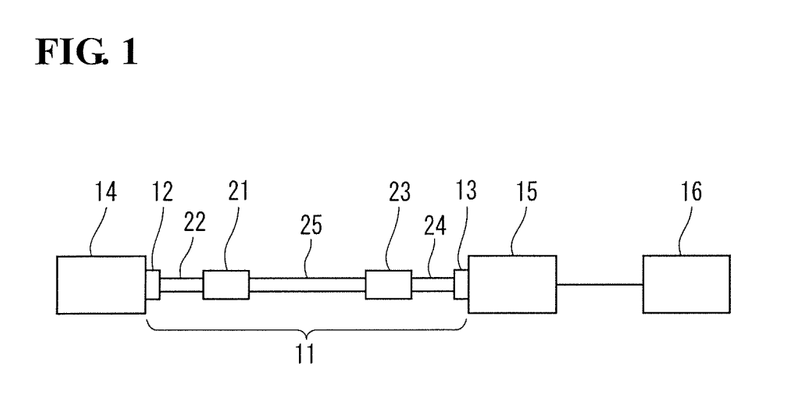
FIG. 1 is a conceptual diagram depicting an opto-electro hybrid harness in the state which occurs during service, according to an embodiment of the present invention.

FIG. 1 is a conceptual diagram depicting an opto-electro hybrid harness 11 in the state which occurs during service according to an embodiment of the present invention. The opto-electro hybrid harness 11 has a first connector 12 at one end thereof, and has a second connector 13 at the other end. In this embodiment, the first connector 12 is connected to the receptacle of a video camera 14 and the second connector 13 is connected to the receptacle of a controller unit 15. The opto-electro hybrid harness 11 is provided with a first relay segment 21 situated away from the first connector 12, and with a first electric cable 22 composed of a plurality of electronic wires disposed between the first connector 12 and the first relay segment 21. A second relay segment 23 is provided between the second connector 13 and the first relay segment 21, and a second electric cable 24 composed of a plurality of electronic wires is disposed between the second connector 13 and the second relay segment 23. An opto-electric hybrid cable segment (abbreviated as hybrid cable segment) 25 is provided between the first relay segment 21 and the second relay segment 23.

Figure 2:
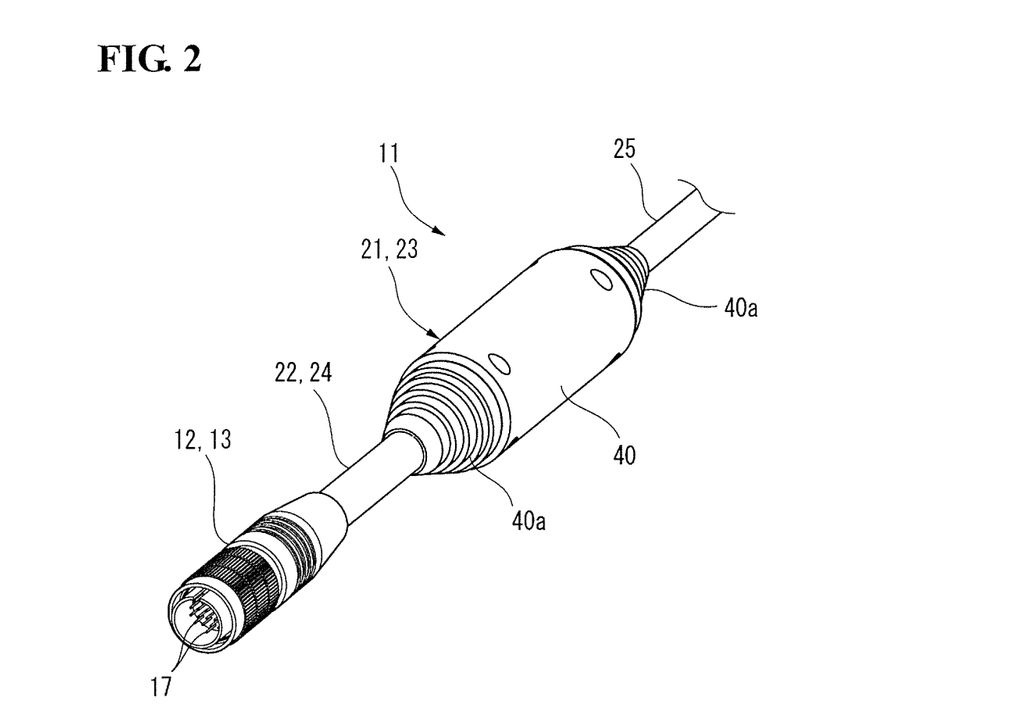
FIG. 2 is a perspective view of an end segment of the opto-electro hybrid harness according to the embodiment of the present invention.

FIG. 2 is a perspective view of an end segment in the opto-electro hybrid harness 11. The first connector 12 and the second connector 13 are composed of electrical connectors of a commonly used type, and have a plurality of connector terminals 17 at the distal end. The connector terminals 17 connect with female terminals of the receptacle of the video camera 14 or the controller unit 15. A picture signal of an image captured by the video camera 14 is transmitted to the controller unit 15 via the opto-electro hybrid harness 11, and is then transmitted to a display 16 which is connected to this controller unit 15.

Figure 3:
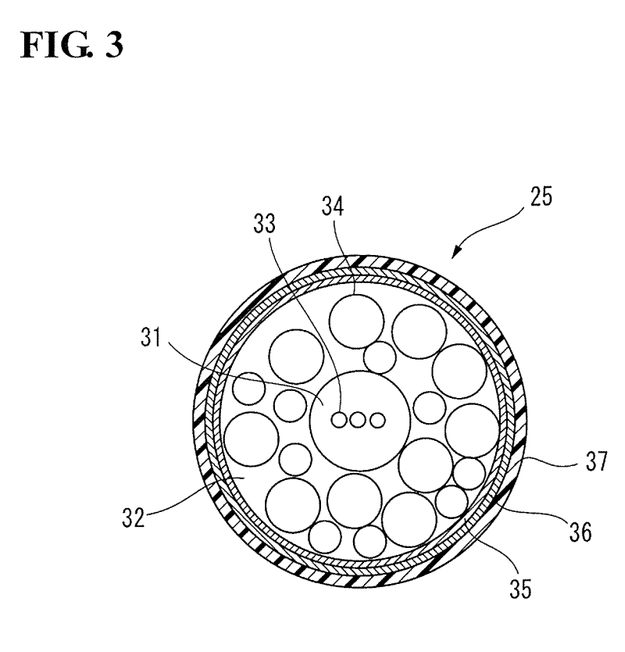
FIG. 3 is a cross sectional view of an opto-electric hybrid cable segment in the opto-electro hybrid harness according to the embodiment of the present invention.

FIG. 3 is a cross sectional view of the hybrid cable segment 25 in the opto-electro hybrid harness 11. The hybrid cable segment 25 has at its center an optical fiber accommodating space 31, and has an electronic wire accommodating space 32 surrounding the optical fiber accommodating space 31. The optical fiber accommodating space 31 accommodates one or several optical fibers 33, while the electronic wire accommodating space 32 accommodates several electronic wires 34.

The optical fibers 33 accommodated in the optical fiber accommodating space 31 are glass fibers composed of a core and cladding, and sheathed with resin. The electronic wires 34 accommodated in the electronic wire accommodating space 32 are, for example, twisted pair cables, coaxial cables, insulated cables, or the like, the size of which are AWG 20 to AWG 46 according to the American Wire Gauge (AWG) standard. The hybrid cable segment 25 is additionally provided with a wrapping 35 and a shield layer 36 in that order around the electronic wire accommodating space 32, with an outer sheath 37 covering the shielded layer 36.

The first electric cable 22 and the second electric cable 24 do not contain optical fibers, but accommodate therein, for example, coaxial cables, insulated cables, twisted pair cables twisted from coaxial cables, or the like, the size of which are AWG 20 to AWG 46. The first electric cable 22 and the second electric cable 24 are likewise provided with a wrapping and a shield layer in that order about the electronic wire accommodating space, with an outer sheath covering the shielded layer.

Figure 4A:
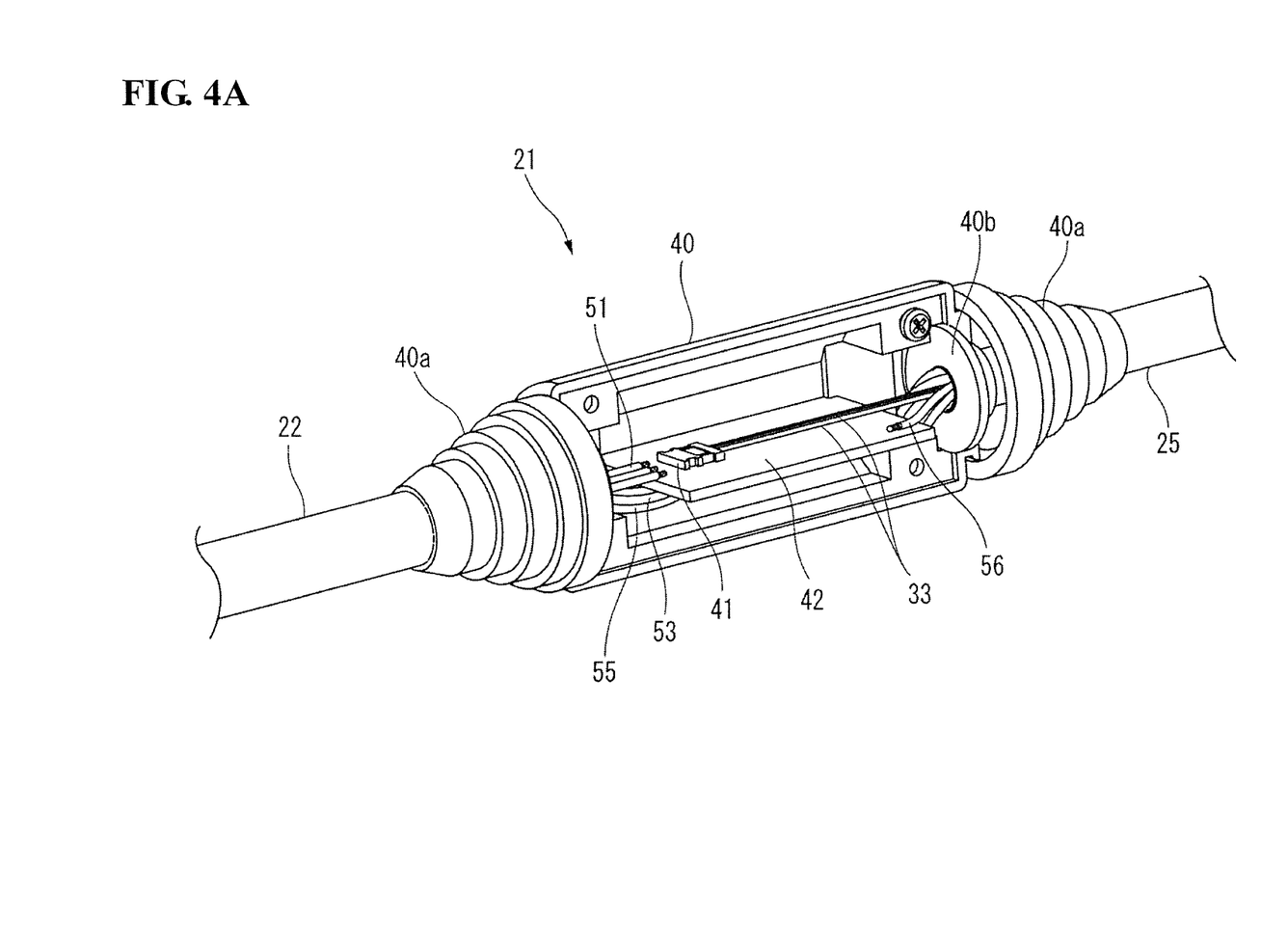
FIGS. 4A and 4B are respectively a perspective view and a side view of the case of a first relay segment of the opto-electro hybrid harness in an opened state, according to the embodiment of the present invention.
Figure 4B:
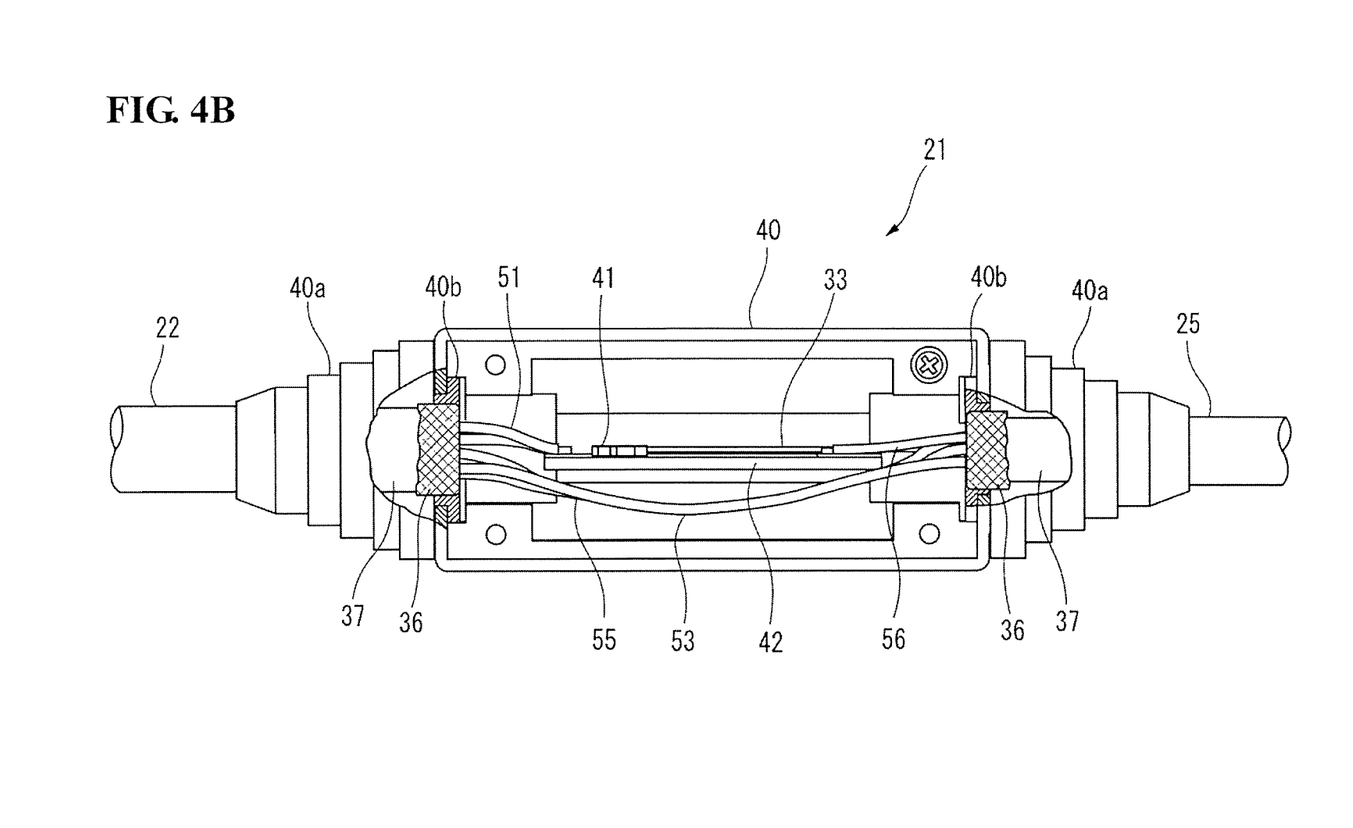

FIGS. 4A and 4B are respectively a perspective view and a side view of the case of the first relay segment 21 in the opened state. The first relay segment 21 includes a case 40 of a cylindrical split-half structure having boots 40a, at both ends; and, inside the case 40, includes a first board 42 having an EO conversion device 41 (an electrical signal to optical signal converter) mounted thereon. The first electric cable 22 is secured to one end of the first relay segment 21, and the hybrid cable segment 25 is secured to the other end. At their end segments inside the case 40, the outer sheath 37 is stripped from the first electric cable 22 and the hybrid cable segment 25, and the shield layer 36 is folded back. The case 40 is composed of metal, or the inside face thereof is metal plated. The shield layer 36 is connected to the metal case 40 or to the metal plated section of the case 40. If the case 40 is made of metal, the shield layer 36 may be crimp-connected by metal rings 40b, that are inset into the metal case 40. The shield layer 36 of the first electric cable 22 and the shield layer 36 of the hybrid cable segment 25 are electrically connected via the case 40.

Figure 5A:
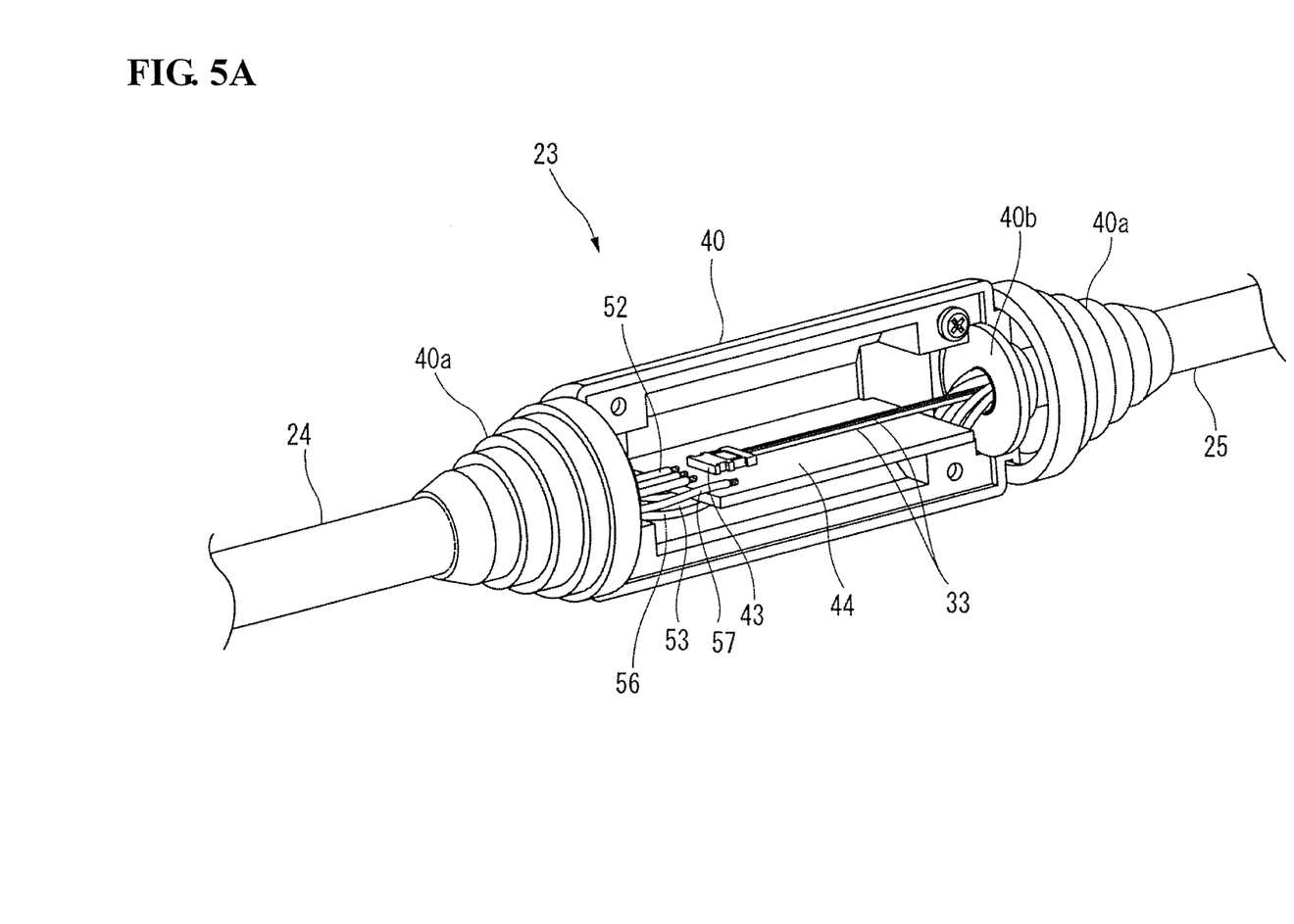
FIGS. 5A and 5B are respectively a perspective view and a side view of the case of a second relay segment of the opto-electro hybrid harness in the opened state according to the embodiment of the present invention.
Figure 5B:
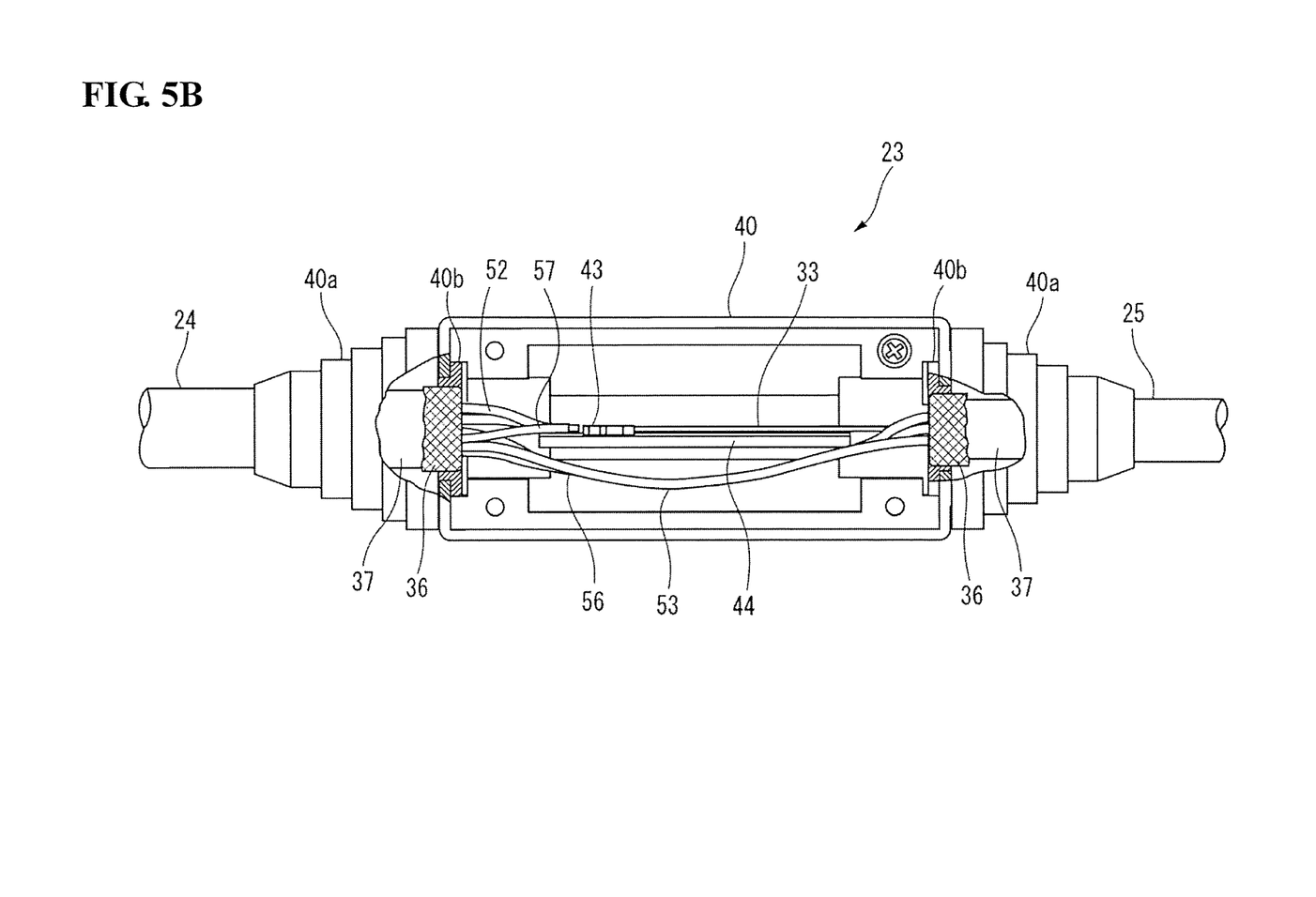

FIGS. 5A and 5B are respectively a perspective view and a side view of the case of the second relay segment 23 in the opened state. The second relay segment 23, like the first relay segment 21, includes a case 40 of a cylindrical split-half structure having boots 40a, at both ends; and, inside the case 40, includes a second board 44 having an OE conversion device 43 (an electrical signal to optical signal converter) mounted thereon. The hybrid cable segment 25 is secured to one end of the second relay segment 23, and the second electric cable 24 is secured to the other end. At the end segments inside the case 40, the outer sheath 37 is stripped from the second electric 24 and the hybrid cable segment 25, and the shield layer 36 is folded back. The case 40 is composed of metal, or the inside face thereof is metal plated. The shield layer 36 is connected to the metal case 40 or to the metal plated section of the case 40. If the case is made of metal, the shield layer 36 may be crimp-connected by metal rings 40b, that are inset into the metal case 40. The shield layer 36 of the second electric cable 24 and the shield layer 36 of the hybrid cable segment 25 are electrically connected via the case 40.

While the opto-electric hybrid harness 11 includes the first relay segment 21 and the second relay segment 23 in its middle section, the respective shield layers of the first electric cable 22, the hybrid cable segment 25, and the second electric cable 24 nevertheless have electrical continuity. The shield layer 36 of the first electric cable 22 is connected to the shell or ground terminal of the first connector 12, and the shield layer 36 of the second electric cable 24 is connected to the shell or ground terminal of the second connector 13. When the first connector 12 and/or the second connector 13 is connected to a device, the shell or ground terminal of the respective connector becomes grounded by connection to the ground circuit of the device.

A vertical cavity surface emitting laser (VCSEL) is employed as the EO conversion device 41. A photo diode (PD) is employed as the OE conversion device 43. The EO conversion device 41 and the OE conversion device 43 are, through bumps or wire bonding, electrically connected to a plurality of electrodes integrally shaped with a ferrule. By connecting the optical fiber 33 to this ferrule, it is possible for optical signals to be transmitted and received among the optical fiber 33, the EO conversion device 41, and the OE conversion device 43. A driver IC for driving the EO conversion device 41 is mounted on the first board 42, and a transimpedance amp (TIA) for amplifying the signal from the OE conversion device 43 is mounted on the second board 44.

According to the embodiment depicted in FIGS. 4A, 4B and FIGS. 5A, 5B, the first board 42 and the split-half face of the case 40 are orthogonal to one another; in preferred practice, however, the first board 42 and the split-half face of the case 40 are arranged parallel to one another, with one face of the first board 42 (the face on which the EO conversion device 41 or the like is mounted) covered by one of the split halves of the case 40. By adopting such an arrangement, the first relay segment 21 may be manufactured by mounting the EO conversion device 41 or the like on the first board 42 while resting on one of the split halves of the case 40, then covering the assembly with the other half of the case 40 like an upper cover, to provide ease of operation when mounting the EO conversion device or the like. Likewise, for the second relay segment 23 as well, it is preferable for one face of the second board 44 (the face on which the OE conversion device 43 or the like is mounted) to be covered by one of the split halves of the case 40. This provides ease of operation when mounting the OE conversion device or the like.

Figure 6:
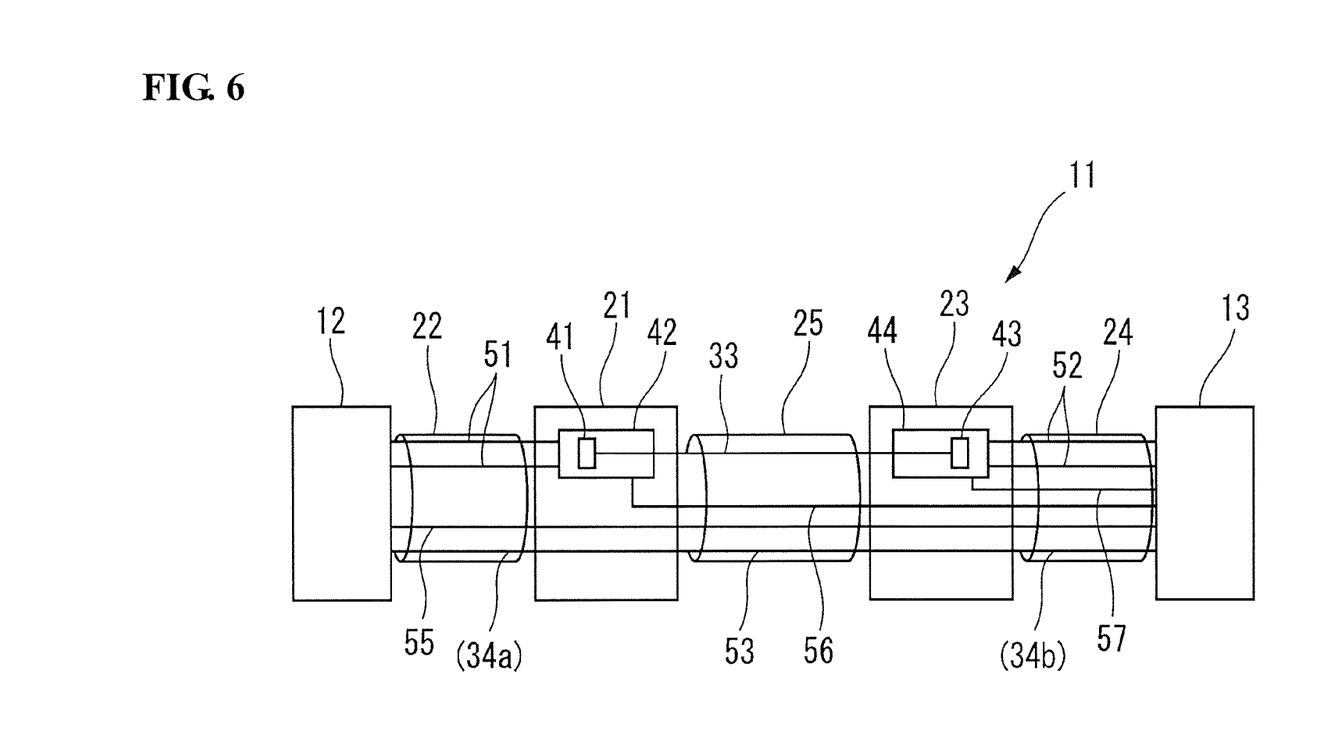
FIG. 6 is a configuration diagram illustrating the opto-electro hybrid harness according to the embodiment of the present invention.

FIG. 6 is a configuration diagram illustrating the opto-electro hybrid harness 11 according to the embodiment of the present invention. In the first relay segment 21, first electronic wires 51 of the first electric cable 22 are connected to a circuit pattern (not shown) of the first board 42, and the first electronic wires 51 are connected to the EO conversion device 41 via this circuit pattern. In the first relay segment 21, one end of the optical fiber 33 which leads out from the end of the hybrid cable segment 25 is connected to the EO conversion device 41. In the second relay segment 23, second electronic wires 52 of the second electric cable 24 are connected to a circuit pattern (not shown) of the second board 44, and the second electronic wires 52 are connected to the OE conversion device 43 via this circuit pattern. In the second relay segment 23, the other end of the optical fiber 33 which leads out from the end of the hybrid cable segment 25 is connected to the OE conversion device 43.

Additionally, a signal wires 53 composed of an electronic wire 34 included in the hybrid cable segment 25 is passed through the first relay segment 21 and the second relay segment 23, and is connected to the first connector 12 and the second connector 13. In preferred practice, for the first board 42, the signal wires 53 passes along a side away from the EO conversion device 41 mounting location, and for the second board 44, the wire passes along a side away from the OE conversion device 43, as shown in FIG. 4B and FIG. 5B. With this arrangement, there is no risk of damage caused by the signal wires 53 bumping against the optical fiber or optical elements on the board, even if the first relay segment 21 or the second relay segment 23 happens to vibrate.

The first electric cable 22 includes a first feeder line 55. One end of the first feeder line 55 is connected to the first connector 12, and the other end is connected to the second connector 13. The video camera 14 is thereby supplied with power from the controller unit 15 via the first feeder line 55.

The hybrid cable segment 25 includes a second feeder line 56. One end of the second feeder line 56 is connected to a circuit leading to the EO conversion device 41 and the driver IC on the first board 42 of the first relay segment 21, and the other end is connected to the second connector 13. The EO conversion device 41 and the driver IC are thereby supplied with power from the controller unit 15 via the second feeder line 56.

The second electric cable 24 includes a third feeder line 57. One end of the third feeder line 57 is connected to a circuit leading to the OE conversion device 43 and the transimpedance amp on the second board 44 of the second relay segment 23, and the other end is connected to the second connector 13. The OE conversion device 43 and the transimpedance amp are thereby supplied with power from the controller unit 15 via the third feeder line 57.

In the opto-electro hybrid harness 11 configured in this manner, a portion of an electrical signal from the video camera 14 is transmitted to the EO conversion device 41 in the first relay segment 21 by the first electronic wires 51 of the first electric cable 22, and is converted to an optical signal by the EO conversion device 41. This optical signal is carried through the optical fiber 33 of the hybrid cable segment 25, converted to an electrical signal by the OE conversion device 43 of the second relay segment 22, and transmitted to the controller unit 15 by the second electronic wires 52 of the second electric cable 24. A portion of the electrical signal from the video camera 14 is also transmitted directly to the controller unit 15 by the signal wires 53. An image captured by the video camera 14 is thereby displayed on the display 16 which is connected to the controller unit 15.

According to the opto-electro hybrid harness 11, electrical connectors, namely the first connector 12 and the second connector 13, can be employed as the connector segments at both ends of the cable. Therefore, high speed communication by the optical fiber 33 can be achieved without increasing the dimensions of the first connector 12 and the second connector 13. Such an arrangement is particularly advantageous in medical device applications, which need high speed communications. Because universal electric connectors can be used for the first connector 12 and the second connector 13, universal electric connectors may be used for the receptacles of the video camera 14 and the controller unit 15 as well for providing excellent economy. Moreover, the two first electronic wires 51 and the two second electronic wires 52 can be respectively connected to both ends of a single optical fiber 33, enabling differential transmission of a signal using the two first electronic wires 51 and two second electronic wires 52 as a set.

Optionally, the signal wires 53 included in the hybrid cable segment 25 may be connected at one end thereof at the first relay segment 21 to one end of electronic wires included in the first electric cable 22, specifically, electronic wires 34a, which are not connected to the circuit leading to the EO conversion device 41, to effect connection to the first connector 12 via the electronic wires 34a. Also, the other end of the signal wires 53 may be connected at the second relay segment 23 to one end of electronic wires included in the second electric cable 24, specifically, electronic wires 34b, which are not connected to the circuit leading to the OE conversion device 43, to effect connection to the second connector 13 via the electronic wires 34b.

Figure 7:
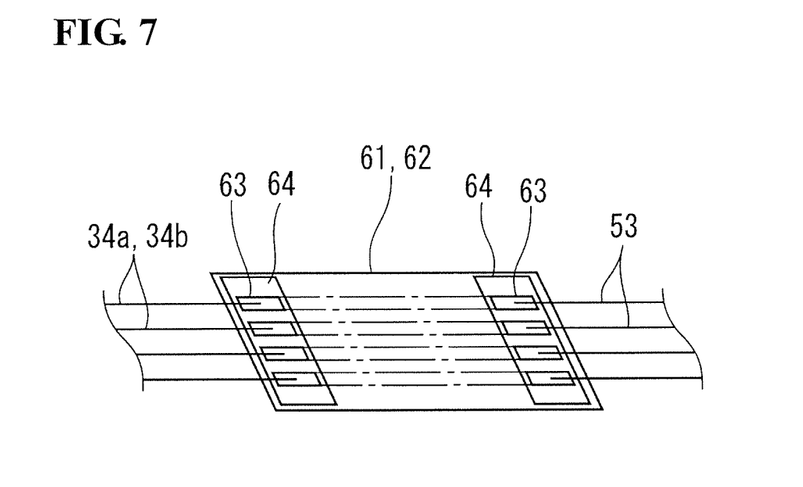
FIG. 7 is a perspective view of a first relay board and a second relay board of the opto-electro hybrid harness according to a modified example of the present invention.

In this case, it is preferable to employ a first relay board 61 and a second relay board 62 (FIG. 7). For example, the electronic wires 34a, of the first electric cable 22 and the signal wires 53 of the hybrid cable segment 25 are respectively connected to the first relay board 61 to create electrical continuity between them. Additionally, the electronic wires 34b, of the second electric cable 24 and the signal wires 53 of the hybrid cable segment 25 are respectively connected to the second relay board 62 to create electrical continuity between them.

It is possible to use, for example, flexible printed circuit boards (FPC) as the first relay board 61 and the second relay board 62; and to accommodate the boards inside the respective cases 40 of the first relay segment 21 and the second relay segment 23. The first relay board 61 and the second relay board 62 are provided with connection terminals 63 arrayed along the width direction, and the conductors of the electronic wires 34a, 34b, and of the signal wires 53 are attached collectively by pulse heat soldering, for example, followed by adhesion of insulating films 64 at the connection sites to provide insulation.

Figure 8:
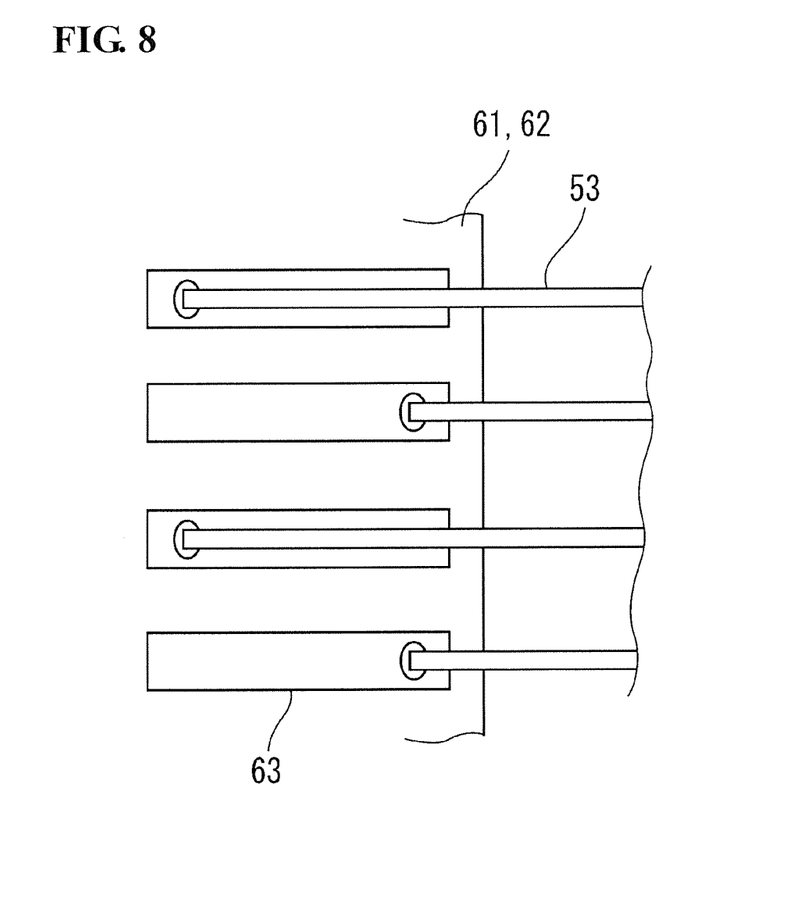
FIG. 8 is a fragmentary plan view showing a section including connection terminals in another example of a first relay board and a second relay board.

FIG. 8 is a fragmentary plan view showing a section including connection terminals in another example of a first relay board and a second relay board. The connection terminals 63 of the first relay board 61 and the second relay board 62, to which terminals the electronic wires 34a,, 34b, and the signal wires 53 are connected, preferably have extended length in the wiring direction. With this arrangement, it is possible for the electronic wires 34a,, 34b, or the signal wires 53 to be connected in zones along the lengthwise dimension of the connection terminals 63 and to thereby compensate for excess length, deviation in position of the ends, and so forth, of the electronic wires 34a,, 34b, or of the signal wires 53. Optionally, the first relay board 61 and the second relay board 62 may be accommodated within the case 40 in a condition of being folded over along the terminal array direction.

Optionally, the signal wires 53 of the hybrid cable segment 25 may be directly connected to the electronic wires 34a,, 34b, included in the first electric cable 22 or the second electric cable 24. In this case, the conductors of the electronic wires 34a,, 34b, and the signal wires 53 to be connected are exposed, connected by soldering, and then insulated by covering the connection sites with an insulating, heat shrinkable tube or by wrapping them with insulating film.

Between the first connector 12 and the second connector 13, the first feeder line 55 and the second feeder line 56 may not be single electronic wire. Optionally, a plurality of electronic wires may be connected via other wiring members, such as the first relay board 61 or the second relay board 62 accommodated in the first relay segment 21 or the second relay segment 23.

Next, each of the steps in a method for manufacturing the opto-electro hybrid harness 11 is described. The order in which the steps are carried out may be modified appropriately.

Relay Segment Attachment Step

The two ends of the hybrid cable segment 25 are subjected to terminal treatment. The first relay segment 21 is attached to one end of the hybrid cable segment 25. The second relay segment 23 is attached to the other end. At both ends of the hybrid cable segment 25, the shield layer 36, which is exposed from under the outer sheath 37, is folded back, and the case 40 is secured to the folded back sections of the shield layer 36 and to the outer sheath 37 (FIG. 4B, FIG. 5B). The case 40 is either made of metal or has a metal plating layer, and the shield layer 36 is connected to a metal section of the case 40.

Optical Fiber Initial End Connection Step

One end of the optical fiber 33 of the hybrid cable segment 25 is connected to the EO conversion device 41 which is disposed on the first board 42 of the first relay segment 21. For example, the glass fiber of the optical fiber 33 is exposed, and secured through insertion into the insertion opening of a ferrule to which the EO conversion device 41 is connected.

First Electronic Wire Connection Step

One end of the first electronic wire 51 of the first electric cable 22 is connected by soldering to the first board 42 of the first relay segment 21, thereby connecting the first electronic wire 51 to the EO conversion device 41 via the circuit on the first board 42. Additionally, the other end of the first electronic wire 51 of the first electric cable 22 is connected to the first connector 12.

Optical Fiber Final End Connection Step

The other end of the optical fiber 33 of the hybrid cable segment 25 is connected to the OE conversion device 43 which is disposed on the second board 44 of the second relay segment 23. For example, the glass fiber of the optical fiber 33 is exposed, and secured through insertion into the insertion opening of a ferrule to which the OE conversion device 43 is connected.

Second Electronic Wire Connection Step

One end of the second electronic wire 52 of the second electric cable 24 is connected by soldering to the second board 44 of the second relay segment 23, thereby connecting the second electronic wire 52 to the OE conversion device 43 via the circuit on the second board 44. Additionally, the other end of the second electronic wire 52 of the second electric cable 24 is connected to the second connector 13.

Signal Wire Connection Step

The signal wires 53 leading out from both ends of the hybrid cable segment 25 are inserted through the electronic wire accommodating spaces of the first electric cable 22 and the second electric cable 24, and connected to the first connector 12 and the second connector 13.

First Feeder Line Connection Step (1) A case of direct connection of the first feeder line 55 to the first connector 12 and the second connector 13

The first feeder line 55 is included in the hybrid cable segment 25. The two ends thereof extend out from the two ends of the hybrid cable segment 25, with the length thereof on the first connector 12 side being sufficient to pass through the first relay segment 21 and the first electric cable 22, and the length thereof on the second connector 13 side being sufficient to pass through the second relay segment 23 and the second electric cable 24. The excess length sections at either end are respectively passed through the first relay segment 21 and the first electric cable 22, and the second relay segment 23 and the second electric cable 24, and connected to the first connector 12 and the second connector 13.

(2) A case of connection of the first feeder line 55 to an additional electronic wire in the second relay segment 23

The excess length section at the first connector 12 side of the first feeder line 55 included in the hybrid cable segment 25 is passed through the first relay segment 21 and the first electric cable 22, and connected to the first connector 12. At the second connector 13 side, the end of the first feeder line 55 is joined to an additional electronic wire in the second relay segment 23 (optionally, via a relay board), and the additional electronic wire is connected to the second connector 13.

(3) A case of connection of the first feeder line 55 to an additional electronic wire in the first relay segment 21

One end of the first feeder line 55 is connected to the first connector 12, and in the first relay segment 21 the other end is connected to an additional electronic wire included in the hybrid cable segment 25. Optionally, the connection is made via a relay board. The additional electronic wire is directly connected to the second connector 13. Alternatively, the wire is connected to an additional electronic wire in the second relay segment 23. Here as well, optionally, the connection may be made via a relay board.

Second Feeder Line Connection Step

One end of the second feeder line 56 included in the hybrid cable segment 25 is connected to a circuit which leads to the EO conversion device 41 and the driver IC on the first board 42, and the other end of the second feeder line 56 is connected to the second connector 13 either directly or via another wiring member such as the second relay board 62. In the case of direct connection to the second connector 13, the second feeder line 56 is extended out from the second connector 13 side of the hybrid cable segment 25, and the excess length section thereof is passed through the second relay segment 23 and the second electric cable 24 and connected to the second connector 13. In the case of connection via another wiring member, in the second relay segment 23, the line is connected to an additional electronic wire included in the second electric cable 24. In this instance, optionally, the connection may be made via a relay board.

Third Feeder Line Connection Step

One end of the third feeder line 57 included in the second electric cable 24 is connected to a circuit leading to the OE conversion device 43 and the transimpedance amp on the second board 44, and the other end of the third feeder line 57 is connected to the second connector 13.

Electric Cable Connection Step

The first relay segment 21 and the second relay segment 23 are respectively attached to the end segments of the first electric cable 22 and the second electric cable 24. The shield layer 36 which is exposed from under the outer sheath 37 in the end segments of the first electric cable 22 and the second electric cable 24 is folded back, and the case 40 is secured to the folded back sections of the shield layer 36 and to the outer sheath 37. The case 40 is either made of metal or has a metal plating layer, and the shield layer 36 is connected to a metal section of the case 40.

Through the steps described above, it is a simple matter to manufacture an opto-electro hybrid harness 11 with universal adaptability and excellent economy. In order to connect the signal wires 53 to the first connector 12 via the additional electronic wires 34a included in the first electric cable 22, in the signal wire connection step, the signal wires 53 are connected at one end to one end of the circuit of the first relay board 61, the additional electronic wires 34a, are connected at one end to the other end of the circuit of the first relay board 61, and these additional electronic wires 34a, are connected at the other end to the first connector 12. In order to connect the signal wires 53 to the second connector 13 via additional electronic wires 34b, included in the second electric cable 24, in the signal wire connection step, the signal wires 53 are connected at one end to one end of the circuit of the second relay board 62, the additional electronic wires 34b, are connected at one end to the other end of the circuit of the second relay board 62, and these additional electronic wires 34b, are connected at the other end to the second connector 13.

Using the first relay board 61 and the second relay board 62 in the above manner makes it possible to eliminate the labor required to pass the signal wires 53 that lead out from the ends of the hybrid cable segment 25 through the electronic wire accommodating spaces of the first electric cable 22 and the second electric cable 24. Alternatively, where the signal wires 53 are directly connected to the first connector 12 and the second connector 13 instead of using the first relay board 61 and the second relay board 62, the labor required to connect the signal wires 53 and the additional electronic wires 34a,, 34b, to the first relay board 61 and the second relay board 62 can be eliminated, and the number of parts is reduced.

The invention claimed is:

1. An opto-electro hybrid harness comprising:
   an opto-electric hybrid cable segment that includes an optical fiber and a signal wire for carrying an electrical signal;
   a first electric cable that includes a first electronic wire and a first feeder line, the opto-electric hybrid cable segment including a second feeder line;
   a second electric cable that includes a second electronic wire and a third feeder line;
   a first relay segment adapted to connect one end of the opto-electric hybrid cable segment and one end of the first electric cable, the first relay segment having a first board, and an EO conversion device mounted on the first board and adapted to convert an electrical signal to an optical signal;
   a second relay segment adapted to connect the other end of the opto-electric hybrid cable segment and one end of a second electric cable, the second relay segment having a second board, and an OE conversion device mounted on the second board and adapted to convert an optical signal to an electrical signal;
   a first connector which is an electrical connector attached to the other end of the first electric cable; and
   a second connector which is an electrical connector attached to the other end of the second electric cable, one end of the first feeder line is connected to the first connector, and the other end of the first feeder line is connected to the second connector either directly or via another wiring member such that the first feeder line supplies electric power from the second connector to the first connector, one end of the second feeder line is connected to a circuit on the first board that leads to the EO conversion device and the other end of the second feeder line is connected to the second connector either directly or via another wiring member such that the second feeder line supplies electric power from the second connector to the first board, one end of the third feeder line is connected to a circuit on the second board that leads to the OE conversion device, and the other end of the third feeder line is connected to the second connector such that the third feeder line supplies electric power from the second connector to the second board;
   wherein
   one end of the optical fiber is optically connected to the EO conversion device, and the other end of the optical fiber is optically connected to the OE conversion device;
   the first electronic wire is adapted to carry an electrical signal to the EO conversion device, one end thereof is connected via a circuit on the first board to the EO conversion device, and the other end thereof is connected to the first connector;
   the second electronic wire is adapted to carry an electrical signal from the OE conversion device, one end thereof is connected via a circuit on the second board to the OE conversion device, and the other end thereof is connected to the second connector; and
   the signal wire is electrically connected to the first connector and to the second connector either directly or via another wiring member.

2. The opto-electro hybrid harness according to claim 1, wherein the signal wire is connected via a first relay board to one end of an additional electronic wire which is an electronic wire included in the first electric cable separately from the first electronic wire; and the other end of the additional electronic wire is connected to the first connector.

3. The opto-electro hybrid harness according to claim 1, wherein the signal wire is connected via a second relay board to one end of an additional electronic wire which is an electronic wire included in the second electric cable separately from the second electronic wire; and the other end of the additional electronic wire is connected to the second connector.

4. The opto-electro hybrid harness according to claim 1, wherein one end of the signal wire is directly connected to the first connector and the other end is directly connected to the second connector.

5. The opto-electro hybrid harness according to claim 4, wherein the signal wire in the first relay segment passes along a side of the first board away from the mounting location of the EO conversion device; and in the second relay segment passes along a side of the second board away from the mounting location of the OE conversion device.

6. The opto-electro hybrid harness according to claim 1, wherein the shield layers of the first electric cable, the opto-electric hybrid cable segment, and the second electric cable are provided with electrical continuity via the first relay segment and the second relay segment.

7. The opto-electro hybrid harness according to claim 1, wherein enclosures of the first relay segment and the second relay segment have a split-half structure; the first board is arranged in the first relay segment such that one of the split halves of the enclosure covers one face of the first board; and the second board is arranged in the second relay segment such that one of the split halves of the enclosure covers one face of the second board.

* * * * *